United States Patent
Hayashi et al.

(10) Patent No.: US 11,447,137 B2
(45) Date of Patent: Sep. 20, 2022

(54) TRAVEL CONTROL DEVICE, VEHICLE, DRIVING ASSISTANCE DEVICE, AND TRAVEL CONTROL METHOD

(71) Applicant: Isuzu Motors Limited, Tokyo (JP)

(72) Inventors: Satoshi Hayashi, Fujisawa (JP); Masaichi Takahashi, Fujisawa (JP); Shinichirou Fukazawa, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 17/256,267

(22) PCT Filed: Jun. 27, 2019

(86) PCT No.: PCT/JP2019/025710
§ 371 (c)(1),
(2) Date: Dec. 28, 2020

(87) PCT Pub. No.: WO2020/004587
PCT Pub. Date: Jan. 2, 2020

(65) Prior Publication Data
US 2021/0221371 A1    Jul. 22, 2021

(30) Foreign Application Priority Data
Jun. 29, 2018 (JP) .............................. JP2018-124839

(51) Int. Cl.
*B60W 30/188* (2012.01)
*B60W 60/00* (2020.01)
(Continued)

(52) U.S. Cl.
CPC .......... *B60W 30/188* (2013.01); *B60W 30/14* (2013.01); *B60W 50/00* (2013.01);
(Continued)

(58) Field of Classification Search
None
See application file for complete search history.

(56) References Cited

U.S. PATENT DOCUMENTS 9,863,345 B2 * 1/2018 Wong ................ F01L 1/344
10,156,197 B1 * 12/2018 Jin .................... F02D 41/005
(Continued)

FOREIGN PATENT DOCUMENTS

CN  106608260 A  *  5/2017  ............ B60W 30/14
CN  107089231 A  *  8/2017  ............ B60W 10/06
(Continued)

OTHER PUBLICATIONS

Improvement in Adaptive Cruise Control Performance (Year: 2010).*
(Continued)

*Primary Examiner* — Dirk Wright

(57) ABSTRACT

Provided are a travel control device, a vehicle, a driving assistance device, and a travel control method that are capable of improving travel control responsiveness. The travel control device comprises: an automatic travel control unit that, when an automatic travel function is active for vehicle travel control, performs a process for calculating and outputting a target output torque for an engine installed in the vehicle through feedback calculation based on the difference between a target value for a control parameter related to the automatic travel function and the actual value of the control parameter; and an engine control unit that controls the engine such that the outputted target output torque and the output torque of the engine match.

7 Claims, 3 Drawing Sheets

(51) Int. Cl.
  *B60W 30/14* (2006.01)
  *B60W 50/00* (2006.01)
(52) U.S. Cl.
  CPC ... *B60W 60/001* (2020.02); *B60W 2050/0008* (2013.01); *B60W 2710/0666* (2013.01); *B60W 2710/105* (2013.01)

(56) References Cited

U.S. PATENT DOCUMENTS

| | | |
|---|---|---|
| 2008/0189021 A1 | 8/2008 | Inoue et al. |
| 2012/0143457 A1 | 6/2012 | Inoue et al. |

FOREIGN PATENT DOCUMENTS

| | | | | |
|---|---|---|---|---|
| CN | 107187447 A | * | 9/2017 | ............ B60W 30/14 |
| DE | 102016012868 A1 | * | 5/2018 | ............ B60W 30/16 |
| DE | 102017221007 A1 | * | 5/2018 | ............. B60K 6/365 |
| JP | 07-017295 | | 1/1995 | |
| JP | 09-202157 | | 6/1997 | |
| JP | 09-202157 | | 8/1997 | |
| JP | 2001-199258 | | 7/2001 | |
| JP | 2001199258 A | * | 7/2001 | |
| JP | 2001-213193 | | 8/2001 | |
| JP | 2004-017867 | | 1/2004 | |
| JP | 2004017867 A | * | 1/2004 | ......... B60K 31/0058 |
| JP | 2007-255402 | | 10/2007 | |
| JP | 2007255402 A | * | 10/2007 | |
| JP | 2008-190343 | | 8/2008 | |
| KR | 20170095614 A | * | 8/2017 | |
| WO | WO 2020/004587 | | 1/2020 | |

OTHER PUBLICATIONS

Lyapunov based predictive control of vehicle drivetrains over CAN (Year: 2013).*
International Search Report and the Written Opinion dated Aug. 27, 2019 From the International Searching Authority Re. Application No. PCT/JP2019/025710 and its Translation of Search Report Into English. (7 Pages).

* cited by examiner

TRAVEL CONTROL DEVICE, VEHICLE, DRIVING ASSISTANCE DEVICE, AND TRAVEL CONTROL METHOD

TECHNICAL FIELD

The present disclosure relates to a travel control apparatus, a vehicle, a driving assistance apparatus and a travel control method.

BACKGROUND ART

In recent years, various driving assistance apparatuses are developed and put into practical use in order to reduce the burden on drivers and avoid accidents. As one of such driving assistance apparatuses, an apparatus provided with an adaptive cruise control function (hereinafter referred to as "ACC function") is known (see, for example, Patent Literature (hereinafter, referred to as PTL) 1). The ACC function is typically used during the traveling on a highway where accelerator and brake operations are relatively infrequent, and a speed range in which the target speed during constant-speed travel can be set (hereinafter referred to as "settable speed range") is predetermined (for example, 40 to 110 km/h).

In a driving assistance apparatus provided with the ACC function, the current vehicle speed is set as a target speed when, for example, the driver operates to enable the ACC function while traveling at a speed within the settable speed range. The driving force and braking force of the vehicle are then controlled in such a way that, with no preceding vehicle, constant-speed travel is performed at the set target speed, and, with a preceding vehicle, following travel is performed while a constant inter-vehicle distance (target inter-vehicle distance) is maintained.

CITATION LIST

Patent Literature

PTL 1
Japanese Patent Application Laid-Open No. H7-17295

SUMMARY OF INVENTION

Technical Problem

In the driving assistance apparatus, the output torque of a vehicle is controlled by, for example, a double feedback calculation composed of a first feedback calculation that calculates the target acceleration of the vehicle in such a way that the difference between the target speed and the actual speed of the vehicle becomes small, and a second feedback calculation that calculates the target torque of the vehicle in such a way that the difference between the target acceleration calculated in the first feedback calculation and the actual acceleration becomes small. Such a double feedback calculation increases the calculation time during travel control and disadvantageously delays the responsiveness of the travel control.

An object of the present disclosure is to provide a travel control apparatus, a vehicle, a driving assistance apparatus and a travel control method which are capable of improving the responsiveness of travel control.

Solution to Problem

A travel control apparatus according to one aspect of the present disclosure includes:
an automatic travel control section that performs, when an automatic travel function is enabled in travel control of a vehicle, a process for calculating a target output torque of an engine by a feedback calculation based on a difference between a target value of a control parameter related to the automatic travel function and an actual value of the control parameter, and outputting the target output torque, the engine being installed in the vehicle; and
an engine control section that controls the engine so that an output torque of the engine matches the target output torque having been output.

A vehicle according to the present disclosure includes:
the travel control apparatus.

A driving assistance apparatus according to the present disclosure includes:
a connection section connected by an in-vehicle network to an engine control section that controls an engine installed in a vehicle; and
an automatic travel control section that performs, when an automatic travel function is enabled in travel control of the vehicle, a process for calculating a target output torque of the engine by a feedback calculation based on a difference between a target value of a control parameter related to the automatic travel function and an actual value of the control parameter, and outputting the target output torque from the connection section via the in-vehicle network to the engine control section.

A travel control method according to the present disclosure includes:
performing, when an automatic travel function is enabled in travel control of a vehicle, a process for calculating a target output torque of an engine by a feedback calculation based on a difference between a target value of a control parameter related to the automatic travel function and an actual value of the control parameter, and outputting the target output torque, the engine being installed in the vehicle; and
controlling the engine such that an output torque of the engine matches the target output torque having been output.

Advantageous Effects of Invention

The present disclosure can improve the responsiveness of travel control.

DESCRIPTION OF EMBODIMENTS

Hereinafter, an embodiment of the present disclosure will be described in detail with reference to the drawings.

The configuration of a vehicle including a driving assistance apparatus in an embodiment of the present disclosure will now be described.

Figure 1:
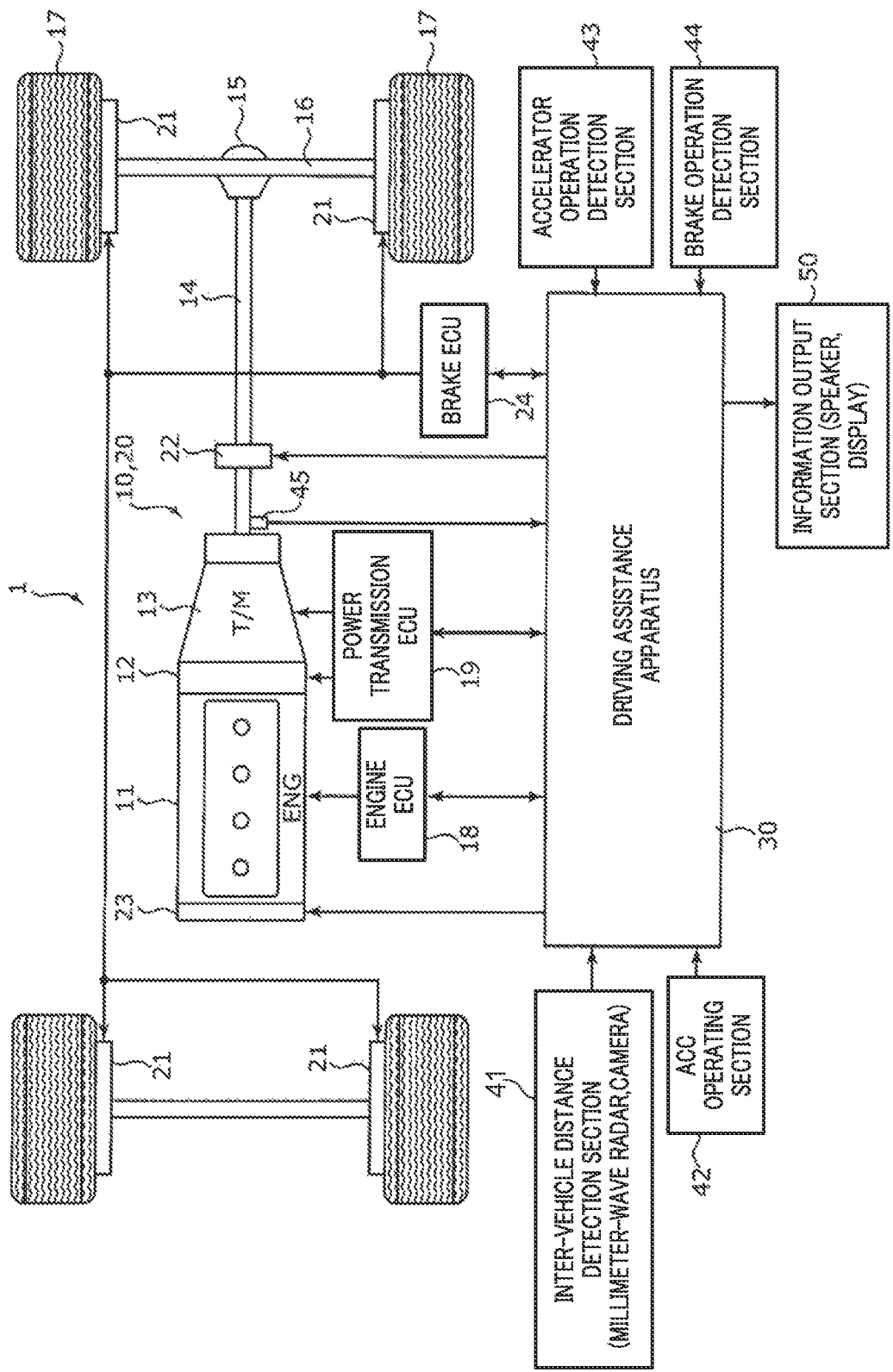
FIG. 1 is a block diagram illustrating an exemplary configuration of a vehicle including a driving assistance apparatus in an embodiment.

FIG. 1 is a block diagram illustrating an exemplary configuration of the vehicle including a driving assistance apparatus in the present embodiment.

Vehicle 1 illustrated in FIG. 1 is, for example, a heavy duty vehicle such as a truck equipped with an in-line six-cylinder diesel engine. As shown in FIG. 1, vehicle 1 includes components such as driving system 10 for running vehicle 1, braking system 20 for decelerating vehicle 1, and driving assistance apparatus 30 for assisting a driver in driving vehicle 1.

Driving system 10 includes engine 11, clutch 12, transmission 13, propeller shaft 14, differential apparatus (differential gear) 15, drive shaft 16, wheels 17, engine electronic control unit (ECU) 18, and power transmission ECU 19.

Engine ECU 18 and power transmission ECU 19 are connected to driving assistance apparatus 30 by an in-vehicle network, such as a controller area network (CAN), and can transmit and receive necessary data and control signals to/from each other. Engine ECU 18 controls the output torque of engine 11 according to a drive command from driving assistance apparatus 30. Power transmission ECU 19 controls the engagement and disengagement of clutch 12 and the speed change of transmission 13 according to a drive command from driving assistance apparatus 30.

The power (output torque) of engine 11 is transmitted to transmission 13 via clutch 12. The power transmitted to transmission 13 is further transmitted to wheels 17 via propeller shaft 14, differential apparatus 15, and drive shaft 16. The power of engine 11 is thus transmitted to wheels 17 and runs vehicle 1 accordingly.

Braking system 20 includes service brake 21, auxiliary brakes 22 and 23, a parking brake (not illustrated), and brake ECU 24.

Service brake 21 is a friction brake and commonly referred to as, for example, a main brake, a foot brake or a foundation brake. Service brake 21 is, for example, a drum brake that obtains a braking force by pressing a brake lining (brake pad) against the inside of a drum rotating with wheels 17.

Auxiliary brake 22 is a retarder (hereinafter referred to as "retarder 22") that obtains a braking force by directly applying a load to the rotation of propeller shaft 14, and is, for example, an electromagnetic retarder. Auxiliary brake 23 is an exhaust brake (hereinafter referred to as "exhaust brake 23") that increases the effect of engine braking by using the rotational resistance of engine 11. Provision of retarder 22 and exhaust brake 23 increases the braking force, and lowers the frequency of use of service brake 21, thus reducing the wear of the brake lining and the like.

Brake ECU 24 and driving assistance apparatus 30 are connected to each other by an in-vehicle network, such as CAN, and can transmit and receive necessary data and control signals to/from each other. Brake ECU 24 controls the braking force of service brake 21 (controls the brake fluid pressure in the wheel cylinders of wheels 17) according to a braking command from driving assistance apparatus 30.

Braking motion of service brake 21 is controlled by driving assistance apparatus 30 and brake ECU 24. Braking motion of retarder 22 and exhaust brake 23 is controlled by driving assistance apparatus 30 turning on and off the brakes. Since the braking forces of retarder 22 and exhaust brake 23 are substantially fixed, service brake 21, which can finely adjust the braking force, is suitable for accurately generating a desired braking force.

Driving assistance apparatus 30 acquires various information from inter-vehicle distance detection section 41, ACC operating section 42, accelerator operation detection section 43, brake operation detection section 44 and vehicle speed sensor 45, and controls the motion of driving system 10 and braking system 20 based on the acquired information.

In addition, driving assistance apparatus 30 outputs various information related to traveling from the information output section 50 by sound, an image and/or the like.

Driving assistance apparatus 30 also enables adaptive cruise control (ACC) as the automatic travel function. In other words, driving assistance apparatus 30 performs constant-speed travel control and following travel control (hereinafter collectively referred to as "automatic travel control") in vehicle 1.

When there is no preceding vehicle within a predetermined range, the constant-speed travel control controls the motion of driving system 10 and braking system 20 in such a way that the running speed of vehicle 1 (hereinafter referred to as "vehicle speed") approaches a predetermined target value (a value or a value range).

When there is a preceding vehicle in the predetermined range, the following travel control controls the motion of driving system 10 and braking system 20 in such a way that the inter-vehicle distance falls within a predetermined target range and the relative speed approaches zero. Driving assistance apparatus 30 will be described in detail below.

Inter-vehicle distance detection section 41 measures (detects) the inter-vehicle distance between vehicle 1 and a preceding vehicle (hereinafter simply referred to as "inter-vehicle distance") and outputs the measurement results to driving assistance apparatus 30. For inter-vehicle distance detection section 41, for example, a laser radar, a millimeter-wave radar, an imaging apparatus and the like can be used alone or in combination. The above-described driving assistance apparatus 30 controls the motion of driving system 10 and braking system 20 during constant-speed travel and following travel, based on the detection results from inter-vehicle distance detection section 41.

ACC operating section 42 includes a main switch for enabling the ACC function and an ACC setting switch for setting and canceling the ACC function. ACC operating section 42 further includes a speed setting button for setting a target value of the vehicle speed, and an inter-vehicle distance setting button for setting an inter-vehicle distance. These switches and buttons may be user interfaces displayed on a display with a touch panel. ACC operating section 42 outputs an operation signal indicating the details of the operation performed in ACC operating section 42 to driving assistance apparatus 30. The above-described driving assistance apparatus 30 sets information on the automatic travel control based on an operation signal from ACC operating section 42 (the driver's operation performed via ACC operating section 42).

Accelerator operation detection section 43 detects whether or not the accelerator pedal for accelerating the vehicle is depressed, and detects the amount of depression of the accelerator pedal. Accelerator operation detection section 43 then outputs the detection results to driving assistance apparatus 30. Driving assistance apparatus 30 sends drive commands to engine ECU 18 and power transmission ECU 19 based on the amount of depression of the accelerator pedal.

Brake operation detection section 44 detects whether or not the brake pedal for the motion of service brake 21 is depressed, and detects the amount of depression of the brake pedal. Brake operation detection section 44 also detects whether or not an auxiliary brake lever for the motion of retarder 22 or exhaust brake 23 is operated. Brake operation detection section 44 then outputs the detection results related to the brake pedal and the auxiliary brake lever to driving assistance apparatus 30. The above-described driving assistance apparatus 30 sends a braking command to brake ECU 24 based on the amount of depression of the brake pedal. Driving assistance apparatus 30 also controls the on/off motion of retarder 22 or exhaust brake 23 based on the operation of the auxiliary brake lever.

Vehicle speed sensor 45 is attached to, for example, propeller shaft 14, detects the vehicle speed, and outputs the detection results to driving assistance apparatus 30.

Information output section 50 includes, for example, a speaker and a display section (display), such as a so-called instrument panel or a display (not illustrated) of a navigation system. Through information output section 50, driving assistance apparatus 30 displays information on various types of instruments, such as a speed meter, a tachometer, a fuel gauge, a water temperature gauge and a distance meter and on the automatic travel control, outputs an alarm sound, and the like.

Engine ECU 18, power transmission ECU 19, brake ECU 24, and driving assistance apparatus 30 each include, although not illustrated, a central processing unit (CPU), a storage medium storing control programs such as a read only memory (ROM), a working memory such as a random access memory (RAM), a communication circuit, and the like. In this case, the CPU executing the control programs allows, for example, the below described components of driving assistance apparatus 30 to function. Engine ECU 18, power transmission ECU 19, brake ECU 24, and driving assistance apparatus 30 includes an interface section (connection section) for exchanging various information with each other via the in-vehicle network.

Vehicle 1 having such a configuration enables not only the normal traveling according to the driver's operation but also the traveling under the automatic travel control according to the vehicle speed, the inter-vehicle distance and the like by driving assistance apparatus 30.

A configuration that functions as the "travel control apparatus" of the present disclosure will now be described with reference to FIG. 2.

Figure 2:
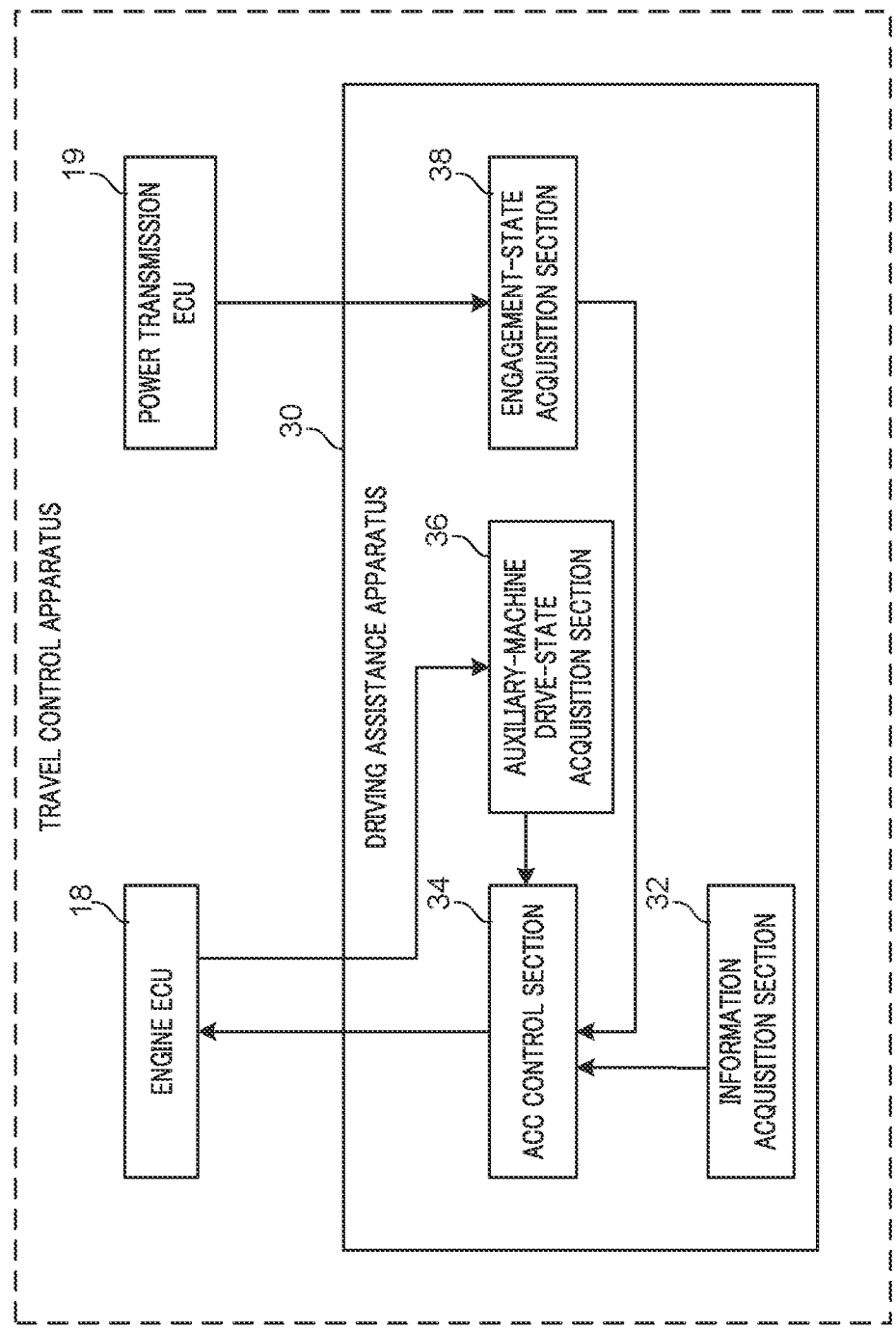
FIG. 2 is a block diagram illustrating an exemplary configuration of a travel control apparatus in the embodiment.

As shown in FIG. 2, a travel control apparatus have a configuration including engine ECU 18 (functioning as "engine control section" of the present disclosure), power transmission ECU 19, and driving assistance apparatus 30.

Driving assistance apparatus 30 includes information acquisition section 32, ACC control section 34 (functioning as "automatic travel control section" of the present disclosure), auxiliary-machine drive-state acquisition section 36 and engagement/disengagement-state acquisition section (hereinafter also referred to as "engagement-state acquisition section") 38.

Information acquisition section 32 acquires a target value of a vehicle speed, a relative speed or an inter-vehicle distance based on, for example, input information from ACC operating section 42, and outputs the acquired target value to ACC control section 34.

Information acquisition section 32 also acquires the vehicle speed, the relative speed of a preceding vehicle relative to vehicle 1 (hereinafter, simply referred to as "relative speed"), and the inter-vehicle distance based on input information from vehicle speed sensor 45 and inter-vehicle distance detection section 41. Information acquisition section 32, for example, records the input information and calculates the relative speed from the change in the inter-vehicle distance in time passage. Information acquisition section 32 then outputs the acquired vehicle speed, relative speed and inter-vehicle distance to ACC control section 34. The vehicle speed, relative speed and inter-vehicle distance correspond to "control parameter related to ACC function" of the present disclosure.

Information acquisition section 32 may appropriately set, for example, the target value of the vehicle speed and the target value of the inter-vehicle distance based on the current vehicle speed, the current inter-vehicle distance, and the inter-vehicle range (level of the inter-vehicle distance) which is preset by a user. For example, information acquisition section 32 receives at the time of starting engine 11 from the driver an operation of selecting one range from a plurality of preset inter-vehicle ranges via the inter-vehicle distance setting button of ACC operating section 42. Information acquisition section 32 sets the target value of the inter-vehicle distance with a larger value as a longer inter-vehicle range is selected or the current vehicle speed is higher. Information acquisition section 32 may display information indicating the set inter-vehicle range on information output section 50.

ACC control section 34 controls driving system 10 and braking system 20 of vehicle 1 in such a way that at least one of the vehicle speed, the relative speed, and the inter-vehicle distance approaches the respective target values. That is, ACC control section 34 performs the above-described automatic travel control.

For example, ACC control section 34 performs proportional control (P control) on the difference between the vehicle speed (actual speed) and its target value (target speed) and on the difference between the relative speed and its target value, and performs integral control (I control) on the difference between the inter-vehicle distance and its target value (inter-vehicle range). That is, ACC control section 34 performs a feedback calculation based on the differences between the target values of the vehicle speed, relative speed and inter-vehicle distance, and the respective actual values of the vehicle speed, relative speed and inter-vehicle distance. ACC control section 34 thus calculates an acceleration/deceleration torque (acceleration torque or deceleration torque) that brings each of these differences close to 0 as the target value of the acceleration/deceleration torque (corresponding to "target output torque" of the present disclosure, and hereinafter referred to as "target output torque"). ACC control section 34 then outputs the calculated target output torque value as a control value for driving system 10 and braking system 20.

Engine ECU 18 acquires a fuel injection amount corresponding to the target output torque (acceleration torque) which is output from ACC control section 34. For example, engine ECU 18 can readily acquire the fuel injection amount corresponding to the target output torque having been output from ACC control section 34, from a correlation map which shows the correlation between the target output torque and the fuel injection amount in engine 11, and is stored in a storage section (not illustrated) in advance.

Engine ECU 18 controls the output of engine 11 by controlling the acquired fuel injection amount. That is, engine ECU 18 controls engine 11 so that the target output torque and the output torque of engine 11 match each other. When the auxiliary machine drive torque of the engine 11 is generated due to, for example, the operation of the power take-off apparatus (PTO apparatus) for driving an auxiliary machine, engine ECU 18 notifies auxiliary-machine drive-state acquisition section 36 of this generation. Auxiliary-machine drive-state acquisition section 36 then notifies ACC control section 34 that the auxiliary machine drive torque of engine 11 is being generated.

Power transmission ECU 19 notifies engagement-state acquisition section 38 of the engagement/disengagement state (hereinafter also referred to as "engagement state") of clutch 12 (whether clutch 12 is in the engaged state or the disengaged state). Engagement-state acquisition section 38 outputs the engagement state of clutch 12 notified from power transmission ECU 19 to ACC control section 34.

In the present embodiment, ACC control section 34 performs the control below in order to reduce the fuel injection amount—the fuel supply amount to engine 11—to improve the fuel efficiency.

That is, when the calculated target output torque is larger than the upper limit torque (upper limit of performance) which defines the upper limit of the output torque of engine 11, ACC control section 34 lowers the target output torque to a torque equal to or less than the upper limit torque (for example, equal to the upper limit torque), and outputs the target output torque. This lowering is because even if a target output torque larger than the upper limit torque is output, the output torque can only be output up to the upper limit torque due to the performance of engine 11. As a result, the fuel efficiency can be improved by reducing the fuel consumption for obtaining an output torque corresponding to the excess over the upper limit torque.

In addition, ACC control section 34 lowers the calculated target output torque according to the generation state of the auxiliary machine drive torque of engine 11, and outputs the lowered target output torque. This lowering is because due to the performance of engine 11, the output torque cannot become any larger when the auxiliary drive torque of engine 11 is generated than when the auxiliary drive torque is not generated. As a result, the fuel efficiency can be improved by reducing the fuel consumption corresponding to the amount that would be consumed for obtaining an output torque if the target output torque was not lowered without taking account of the generation of the auxiliary drive torque of engine 11.

Further, ACC control section 34 performs the feedback calculation when clutch 12 is in the engaged state, but does not perform the feedback calculation while the automatic travel function is kept enabled when clutch 12 is in the disengaged state. This selection of performance is because when clutch 12 is in the disengaged state, such as when vehicle 1 is being shifted or coasting, the output torque of engine 11 would not be transmitted to wheels 17 of vehicle 1 (the output torque would not be reflected in the travel control) if the target output torque calculated by the feedback calculation was output. As a result, the fuel efficiency can be improved by reducing the fuel consumption for obtaining an output torque corresponding to the calculated target output torque. In addition, if the above feedback calculation was performed when clutch 12 is in the disengaged state (i.e., when the output torque is not reflected in the travel control), the difference between the inter-vehicle distance and its target value would be increased. This selection of performance can thus eliminate unnecessary increase of the integration error in the integration control (I control).

When the ACC function is not enabled, ACC control section 34 controls components of vehicle 1 including driving system 10 and braking system 20 based on the operation on the operation interfaces (none of which are illustrated) of, for example, an accelerator, a brake, a shift lever, and a steering wheel. Since such control is the same as control in normal traveling in a conventional vehicle, the description thereof will be omitted.

Figure 3:
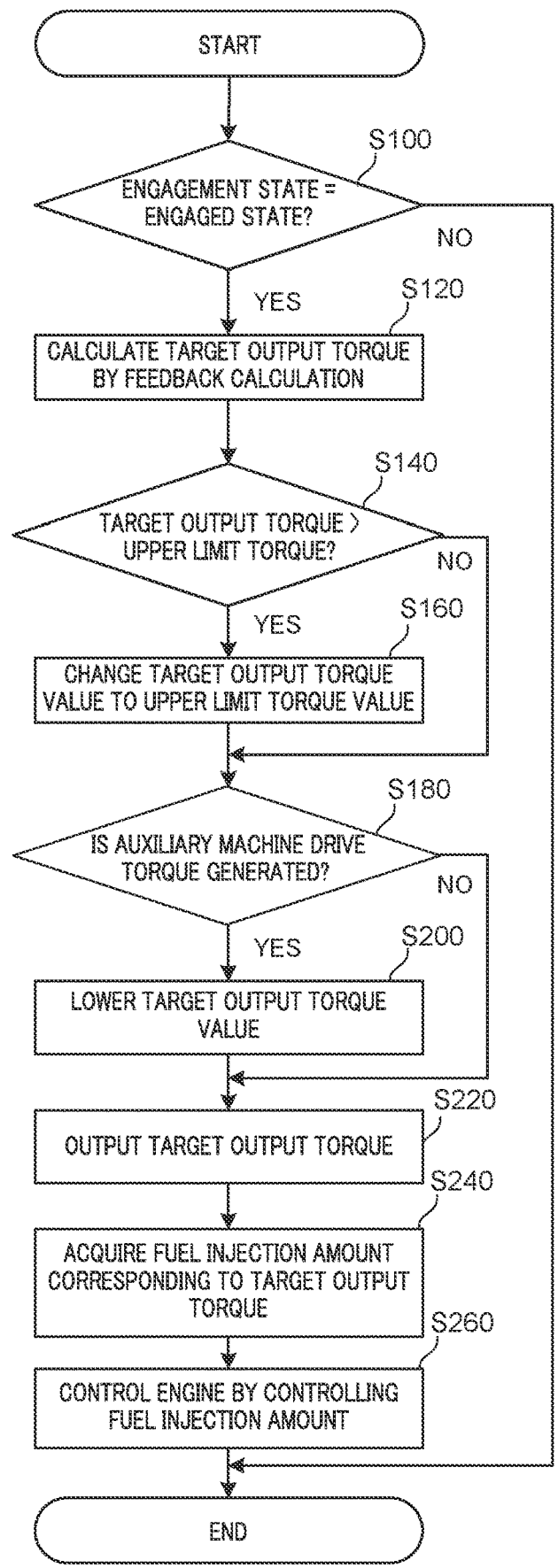
FIG. 3 is a flowchart illustrating an exemplary motion of the travel control apparatus in the embodiment.

An exemplary motion of the travel control apparatus in the present embodiment will now be described with reference to the flowchart of FIG. 3. The process of FIG. 3 is executed for each control cycle of the travel control apparatus when the ACC function is enabled in the travel control of vehicle 1.

First, ACC control section 34 determines whether or not the engagement state of clutch 12 is the engaged state (i.e., whether clutch 12 is in the engaged state) (step S100). When clutch 12 is determined to be not in the engaged state (step S100, NO), the travel control apparatus ends the process in FIG. 3.

On the other hand, when clutch 12 is in the engaged state (step S100, YES), ACC control section 34 calculates a target output torque (acceleration torque) by a feedback calculation based on the difference between the target values of the vehicle speed, relative speed and inter-vehicle distance and the corresponding actual values of the vehicle speed, relative speed and inter-vehicle distance (step S120). Next, ACC control section 34 determines whether or not the calculated target output torque is larger than the upper limit torque (upper limit of performance) of engine 11 (step S140).

When the target output torque is determined to be not larger than the upper limit torque of engine 11 (step S140, NO), the process proceeds to step S180. On the other hand, when the output target torque is larger than the upper limit torque of engine 11 (step S140, YES), ACC control section 34 changes the value of the target output torque to the value of the upper limit torque (step S160). The process then proceeds to step S180.

In step S180, ACC control section 34 determines whether or not the auxiliary machine drive torque of engine 11 is generated. When the auxiliary machine drive torque of engine 11 is determined to be not generated (step S180, NO), the process proceeds to step S220.

On the other hand, when the auxiliary machine drive torque of engine 11 is generated (step S180, YES), ACC control section 34 lowers the value of the target output torque (step S200). The process then proceeds to step S220.

In step S220, ACC control section 34 outputs the target output torque to engine ECU 18. In the present embodiment, ACC control section 34 outputs the ratio (0 to 100%) of the target output torque with the upper limit torque of engine 11 set to be 100%. Next, engine ECU 18 acquires the fuel injection amount corresponding to the target output torque (acceleration torque) which is output from ACC control section 34 (step S240).

Finally, engine ECU 18 controls engine 11 to match the output torque of engine 11 and the target output torque by controlling the acquired fuel injection amount (step S260). When the process of step S260 is completed, the travel control apparatus ends the process in FIG. 3.

As described in detail in the present embodiment, the travel control apparatus includes: an automatic travel control section (ACC control section 34) which performs, when an automatic travel function (ACC function) is enabled in travel control of vehicle 1, a process for calculating a target output torque of vehicle 1 by a feedback calculation based on the difference between a target value of a control parameter (vehicle speed, relative speed and/or inter-vehicle distance) related to the automatic travel function and an actual value of the control parameter and outputting the target output torque; and an engine control section (engine ECU 18) which controls engine 11 installed in vehicle 1 so that an output torque of engine 11 matches the target output torque that has been output.

The present embodiment configured as described above calculates the target output torque of vehicle 1 by one feedback calculation, and controls engine 11 so that the output torque of engine 11 matches the target output torque that has been output. The present disclosure thus can improve the responsiveness of travel control because the calculation time during travel control can be reduced as compared to the conventional art which controls an output torque by a double feedback calculation composed of a first feedback calculation that calculates the target acceleration of the vehicle in such a way that the difference between the target speed and the actual speed of the vehicle becomes small, and a second feedback calculation that calculates the target torque of the vehicle in such a way that the difference between the target acceleration and the actual acceleration becomes small.

The above embodiment describes, as an example, ACC control section 34 outputting, when the calculated target output torque is larger than the upper limit torque of engine 11, the upper limit torque as the target output torque, but the present disclosure is not limited to this example. For example, when the calculated target output torque is larger than the upper limit torque of engine 11, ACC control section 34 may output a torque smaller than the upper limit torque as the target output torque.

The above embodiment describes, as an example, ACC control section 34 reducing the fuel injection amount to improve fuel efficiency, but ACC control section 34 does not necessarily to perform control for reducing the fuel injection amount to improve fuel efficiency.

In addition, all of the above embodiments are merely examples of embodiment of the present disclosure, and the technical scope of the present disclosure should not be construed in a limited manner by these embodiments. That is, the present disclosure can be carried out in various forms without departing from the spirit and the main features thereof.

This application is based on Japanese Patent Application No. 2018-124839, filed on Jun. 29, 2018, the contents of which are incorporated herein by reference.

INDUSTRIAL APPLICABILITY

The present disclosure is particularly advantageous for a travel control apparatus, vehicle, driving assistance apparatus and a travel control method which are capable of improving the responsiveness of travel control.

REFERENCE SIGNS LIST

1 Vehicle
10 Driving system
11 Engine
12 Clutch
13 Transmission
14 Propeller shaft
15 Differential apparatus
16 Drive shaft
17 Wheel
18 Engine ECU
19 Power transmission ECU
20 Braking system
21 Service brake
22 Retarder
23 Exhaust brake
24 Brake ECU
30 Driving assistance apparatus
32 Information acquisition section
34 ACC control section
36 Auxiliary-machine drive-state acquisition section
38 Engagement-state acquisition section
41 Inter-vehicle distance detection section
42 ACC operating section
43 Accelerator operation detection section
44 Brake operation detection section
45 Vehicle speed sensor
50 Information output section

What is claimed is:

1. A travel control apparatus, comprising:
an automatic travel control section that performs, when an automatic travel function is enabled in travel control of a vehicle, a process for calculating a target output torque of an engine by a feedback calculation based on a difference between a target value of a control parameter related to the automatic travel function and an actual value of the control parameter, and outputting the target output torque, the engine being installed in the vehicle; and
an engine control section that controls the engine so that an output torque of the engine matches the target output torque having been output,
wherein the automatic travel control section lowers the target output torque according to a generation state of an auxiliary machine drive torque of the engine, and outputs the lowered target output torque.

2. The travel control apparatus according to claim 1, wherein:
when the target output torque is larger than an upper limit torque that defines an upper limit of the output torque of the engine, the automatic travel control section lowers the target output torque to a torque equal to or less than the upper limit torque, and outputs the lowered target output torque.

3. The travel control apparatus according to claim 1, wherein:
the output torque of the engine is transmitted to a wheel of the vehicle via a clutch; and
when the clutch is in an engaged state, the automatic travel control section performs the feedback calculation, and when the clutch is in a disengaged state, the automatic travel control section does not perform the feedback calculation while the automatic travel function is kept enabled.

4. The travel control apparatus according to claim 1, wherein:
the automatic travel function is an adaptive cruise control function.

5. A vehicle comprising the travel control apparatus according to claim 1.

6. A driving assistance apparatus, comprising:
a connection section connected by an in-vehicle network to an engine control section that controls an engine installed in a vehicle; and
an automatic travel control section that performs, when an automatic travel function is enabled in travel control of the vehicle, a process for calculating a target output torque of the engine by a feedback calculation based on a difference between a target value of a control parameter related to the automatic travel function and an actual value of the control parameter, and outputting the target output torque from the connection section via the in-vehicle network to the engine control section,
wherein the automatic travel control section lowers the target output torque according to a generation state of an auxiliary machine drive torque of the engine, and outputs the lowered target output torque.

7. A travel control method, comprising:

performing, when an automatic travel function is enabled in travel control of a vehicle, a process for calculating a target output torque of an engine by a feedback calculation based on a difference between a target value of a control parameter related to the automatic travel function and an actual value of the control parameter, and outputting the target output torque, the engine being installed in the vehicle; and controlling the engine so that an output torque of the engine matches the target output torque having been output, wherein, in the process for calculating a target output torque, the target output torque is lowered according to a generation state of an auxiliary machine drive torque of the engine.

* * * * *